United States Patent [19]

Oike

[11] Patent Number: 5,279,873

[45] Date of Patent: Jan. 18, 1994

[54] COMPOSITE MATERIAL FOR BALLOON AND BALLOON MADE THEREOF

[75] Inventor: Kozo Oike, Kyoto, Japan

[73] Assignee: Oike Industrial Co., Ltd., Kyoto, Japan

[21] Appl. No.: 786,216

[22] Filed: Oct. 31, 1991

[30] Foreign Application Priority Data

Nov. 2, 1990 [JP] Japan .................. 2-298639

[51] Int. Cl.$^5$ .............................................. A63H 3/06
[52] U.S. Cl. .................................. 428/35.4; 428/35.7; 428/34.4; 428/446; 428/448; 428/451; 446/220; 446/222
[58] Field of Search .............. 446/220, 222; 428/35.2, 428/35.3, 35.4, 35.7, 34.4, 446, 448, 451

[56] References Cited

U.S. PATENT DOCUMENTS

| 4,552,791 | 11/1985 | Hahn | 428/35.7 |
| 4,634,395 | 1/1987 | Burchett | 446/222 |
| 4,684,553 | 8/1987 | Sasaki | 428/35.7 |
| 4,847,157 | 7/1989 | Goodman | 428/448 |
| 5,017,254 | 5/1991 | Noguchi | 446/220 |

FOREIGN PATENT DOCUMENTS 5312953 4/1974 Japan .
5148511 5/1974 Japan .

Primary Examiner—Henry F. Epstein
Assistant Examiner—Rena L. Dye
Attorney, Agent, or Firm—Armstrong, Westerman, Hattori, McLeland & Naughton

[57] ABSTRACT

A composite material for a balloon having a transparency and a gas barrier, including a polymer base layer and a transparent thin layer of a silicon oxide provided on one surface of the polymer base layer, the silicon oxide layer having an atomic ratio of silicon to oxygen of 1:0.3 to 2. The composite material has a high degree of barrier to helium gas or hydrogen gas. A balloon produced from the composite material retains its buoyancy for a long period of time.

8 Claims, No Drawings

5,279,873

COMPOSITE MATERIAL FOR BALLOON AND BALLOON MADE THEREOF

BACKGROUND OF THE INVENTION

The present invention relates to a composite material for balloon and a balloon made thereof. More particularly it relates to a transparent composite material for balloon having an excellent gas barrier to helium gas, hydrogen gas or the like and a balloon made thereof.

Heretofore balloons with a variety of sizes are employed for use in toys, advertising media, articles for display, and the like. Most balloons are used in a state of floating in the air with being filled with helium gas or hydrogen gas.

In order to endow a balloon with a sufficient buoyancy in the air, it is necessary to make the specific gravity, on the basis of air, of the balloon filled with a gas not more than 1. In order to achieve this, it is necessary to select, as a gas to be filled, as light a gas as possible, and as a balloon material, a material which is light and has the property that the gas filled in the balloon does not leak out through the wall of the balloon and such a great tensile strength that the balloon does not easily burst.

Rubber materials are used as the material for small-sized balloons such as toy balloons. However, common balloon materials are plastic materials having a gas barrier to helium gas or hydrogen gas, laminated with a sealant film such as polyethylene film or nonstretched polypropylene. Examples of the gas barrier plastic materials are plastic films of ethylene-vinyl alcohol copolymer, nylons, polyethylene terephthalate (PET), and vinylidene chloride resin-coated nylon films or PET films. Other laminated materials are also used wherein a nylon film or a PET film which is laminated with an aluminum leaf or has a deposition layer of aluminum or other metals to improve the gas barrier is laminated with a sealant film such as polyethylene film or nonstretched polypropylene film.

However, the above-mentioned rubber material has the drawbacks as follows: It has a poor gas barrier and a balloon made thereof is very easily broken. Further the inside of the balloon is not easily visible because of its poor transparency.

On the other hand, balloons made of the above-mentioned plastic materials are hard to be broken because of their great tensile strength. However, there is a problem that because the plastic materials do not have a sufficient gas barrier, the gas contained in the balloon escapes through its wall for a comparatively short time so that the balloon loses buoyancy. When it is tried to improve the gas barrier by using a thicker plastic film, there are problems such as the decrease in buoyancy due to the increase in weight and the losing of flexibility.

The plastic materials laminated with an aluminum leaf and the plastic materials provided with a metal deposition layer thereon are desirable because of their good gas barrier. However, the use thereof are limited because the inside of the balloon is invisible.

It is an object of the present invention to provide a composite material for balloon which is transparent and has an excellent gas barrier to helium gas or hydrogen gas.

Another object of the present invention is to provide a balloon the inside of which is visible and which retains the buoyancy for a long period of time.

These and other objects of the present invention will become apparent from the description hereinafter.

SUMMARY OF THE INVENTION

The present invention provides a composite material for balloon having a transparency and a gas barrier, comprising a polymer base layer and a transparent thin layer of a silicon oxide provided on one surface of the polymer base layer, said silicon oxide layer having an atomic ratio of silicon to oxygen of 1:0.3 to 2, and a balloon made of the composite material.

The composite material for ballon in accordance with of the present invention is characterized in that it comprises the above-mentioned specific transparent thin silicon oxide layer provided on a polymer base layer. The composite material is transparent and has an excellent gas barrier to helium gas, hydrogen gas or the like. Accordingly a high degree of gas barrier is secured even though the thickness of the composite material is not made excessively greater. Thus the composite material is suitable as a constituting material for a balloon which is floated in the air with being filled with a gas. Further, the silicon oxide layer shows a great bonding strength to the polymer base layer, and since the silicon oxide layer exhibits a good wettability to a polymer film or the like, a laminated material composed of a polymer base layer and a polymer film or the like laminated to the base layer through the silicon oxide layer has a great laminating strength.

DETAILED DESCRIPTION

Herein, the term "balloon" is intended to be used as a generic name indicating not only usual spherical balloons but also all three dimensional bodies floatable with being filled with a gas such as helium gas or hydrogen gas.

The transparent polymer base layer used in the present invention is not particularly limitative. Examples of the base layer are polymer films including nylon films, polyester films such as PET film, nylon films coated with a vinylidene chloride resin, PET film coated with a vinylidene chloride resin, nonstretched or biaxially stretched polypropyrene film, ethylene-vinyl alcohol copolymer (EVOH) film, polyethylene film, polyvinyl alcohol film and polyvinylidene chloride film. Polyester film, nylon film and EVOH film are preferably used because they are excellent in the gas barrier, the bonding property to the deposition layer of silicon oxide, the toughness and the low specific gravity which are required for the balloon material.

The thickness of the base layer varies depending upon the size of balloon and the manner of using the balloon. Generally, the thickness is selected from the range of 6 to 50 μm. However, thinner or thicker films can be used depending upon the required strength, light weight and etc.

The transparent thin layer of silicon oxide is provided on the polymer base film in the presence or absence of an undercoat between both layers.

The atomic ratio of silicon to oxygen in the silicon oxide layer is preferably from 1:0.3 to 2, more preferably from 1:0.7 to 1.9. When the proportion of the oxygen is more than the above range, particularly the ratio 1:2, a desired gas barrier is not obtained. When the proportion of the oxygen is less than the above range, the transparency is lowered although the gas barrier is good.

The thickness of the silicon oxide layer is preferably from 20 to 100 nm, more preferably from 30 to 80 nm. When the thickness is less than the above range, a sufficient barrier is not obtained. When the thickness is more than the above range, the cost rises, cracks tend to occur in the silicon oxide layer and the degree of coloring of the silicon oxide layer becomes marked with increasing thickness.

In the present invention, the thickness of the silicon oxide layer is measured by means of a thickness monitor using a quartz crystal oscillator.

The transparent thin layer of silicon oxide can be formed by using an appropriate method including physical vapor deposition methods (PVD) such as vacuum deposition method, sputtering method and ion plating method, and a chemical vapor deposition method (CVD). In the vacuum deposition method, SiO or a mixture of Si and $SiO_2$ or the like can be used as a vaporizing source material. The atomic ratio of silicon to oxygen in the silicon oxide layer can be arbitrarily varied within the above-mentioned range by using a mixture of Si and $SiO_2$ as a vaporizing source and changing the mixing ratio thereof.

The above-mentioned composite material composed of the polymer base layer and the transparent thin silicon oxide layer provided on one surface of the base layer can be used as a balloon material as it is. Usually, however, the composite material is used in a form wherein a top coat or a polymer film layer is further provided on the thin silicon oxide layer.

The top coat is provided for the purpose of protecting the thin silicon oxide layer. The top coat may be a hot melt adhesive to endow the composite material with a heat sealability. The top coat can be formed by applying a solution of a resin in an appropriate solvent onto the thin silicon oxide layer by means of a conventional coating method such as gravure coating. Examples of the resins for the top coat are vinyl chloride-vinyl acetate copolymer, polyethylene, polyamides, polyesters, acrylic resins and nitrocellulose. A heat sealable top coat may be formed by a hot melt coating method.

The thickness of the top coat is suitably selected depending upon its purpose, i.e. the purpose of merely protecting the silicon oxide layer or the purpose of further imparting a heat sealability to the composite material. Usually, however, the thickness is from 0.5 to 30 $\mu$m.

The polymer film layer is provided for the purposes of protecting the thin silicon oxide layer and of imparting a great tensile strength to the composite material of the present invention. A heat sealable polymer film layer is preferred. The polymer film layer is provided on the silicon oxide layer directly or through an undercoat. The material for the polymer film layer is not limited. Examples of the polymer film are nonstretched polypropylene film, polyethylene film, ethylene-vinyl acetate copolymer film, ethylene-acrylic acid copolymer film, and films of ethylene polymer ionomers such as ionomer of ethylene-vinyl acetate copolymer and ionomer of ethylene-acrylic acid copolymer. The polymer film is usually provided on the silicon oxide layer by means of a dry lamination method or an extrusion lamination method. The thickness of the polymer film layer is preferably from 6 to 40 $\mu$m.

The above-mentioned undercoat is an optional layer provided to improve a bonding property or adhesion between the silicon oxide layer and the polymer base layer or the polymer film layer. Examples of the material for the undercoat are polyurethanes, isocyanate compounds, urethane propolymers, and mixtures or reaction products of the foregoing materials; polyesters, and mixtures or reaction products of polyols and isocyanate compounds; polyethylene imine, alkyl titanates and modified polyolefins. The undercoat is formed by applying the above material by means of a conventional coating method such as gravure method in a thickness of 0.1 to 2 $\mu$m (value after being dried).

The construction of the composite material for balloon in accordance with the present invention includes a variety of embodiments. The typical embodiments thereof are as follows. However, the present invention is not limited to these embodiments.

(1) Base layer/Silicon oxide layer
(2) Base layer/Silicon oxide layer/Top coat
(3) Base layer/Silicon oxide layer/Polymer film layer
(4) Base layer/Silicon oxide layer/Polymer film layer/Top coat
(5) Base layer/Under coat/Silicon oxide layer/Top coat
(6) Base layer/Under coat/Silicon oxide layer/Polymer film layer
(7) Base layer/Silicon oxide layer/Under coat/Polymer film layer Each of the above embodiments means that the layer on the right-handed side of the slash is superimposed on the layer on the left-handed side of the slash.

The composite material of the present invention has a high degree of gas barrier as well as a colorless transparency. That is, the composite material has a helium gas transmission rate of not more than 5 ml/m$^2$·24 hrs·atm. and a hydrogen gas transmission rate of not more than 7 ml/m$^2$·24 hrs·atm.

Accordingly, the balloon made of the composite material, when it is filled with a gas such as helium gas or hydrogen gas, can be floated in the air without replenishing the gas for a long period of time.

The size of the balloon of the present invention is not particularly limitative. However, when the size is too small, a sufficient buoyancy is not obtained, and when the size is too large, problems in relation to the strength occur. Accordingly, the balloon preferably has a volume of about 5 to 5,000 liters.

The shape of the balloon is not limited to a spherical one and can include any arbitrary shapes such as Rugby ball shape, cylindrical shape, shapes of animals, and other complicated shapes.

The method of processing the composite material of the present invention into the above various shapes is as follows. A development of a desired three dimensional shape is prepared and the composite material is cut into pieces according to the development. The pieces are adhered to each other by means of heat sealing in the case that the uppermost layer of the composite material is a heat sealable polymer film layer or a heat sealable top coat, or by means of an adhesive in other cases, thereby providing an airtight structure. The balloon is provided with one or more gas inlets with a check valve.

The balloon of the present invention, once filled with helium gas or hydrogen gas, retains its buoyancy for a long period of time because the composite material constituting the balloon has a high degree of barrier to the gas. Further, since the balloon is transparent, it is applicable to a wide variety of fields as toys, articles for display, ad balloons, etc. For example, when the balloon is provided with patterns including letters and marks on the outer surface or inner surface thereof and a lighting device within the inside thereof and the balloon is illuminated from the inside thereof, the balloon and the patterns on the surface thereof are visible even in the night. Moreover, the public's attention can be attracted by floating in the air the balloon in which a sample of goods is placed. When the balloon is floated in the air, it is better to moor the balloon to the ground, the rooftop or side wall of a building, the floor or wall of a room or the like with a rope or a cable, thereby always maintaining it under control so that the balloon is not carried away by wind or another cause.

The present invention is more specifically described and explained by means of the following Examples. It is to be understood that the present invention is not limited to the Examples, and various changes and modifications may be made in the invention without departing from the spirit and scope thereof.

EXAMPLE 1

On one surface of a stretched PET film having a thickness of 12 $\mu$m was formed a silicon oxide layer (atomic ratio of silicon to oxygen=1:1.7) having a thickness of 70 nm by vacuum deposition method using a mixture of Si and $SiO_2$ as a vaporizing source. A nonstretched polyethylene film having a thickness of 30 $\mu$m was laminated onto the deposition layer by the dry lamination method wherein a polyester adhesive was applied onto the deposition layer in a thickness of 3 $\mu$m (value after being dried) and dried at 80° C. for 20 seconds and the polyethylene film was pressed onto the adhesive layer at 100° C. for 1 second under a pressure of 2 kg/cm$^2$, thereby yielding a composite material in accordance with the present invention.

EXAMPLE 2

The same procedures as in Example 1 except that a stretched nylon-6 film having a thickness of 15 $\mu$m was used instead of the stretched PET film, were repeated to give a composite material having a construction similar to that of Example 1.

EXAMPLE 3

The same procedures as in Example 1 except that a stretched EVOH film having a thickness of 15 $\mu$m was used instead of the stretched PET film, were repeated to give a composite material having a construction similar to that of Example 1.

EXAMPLE 4

On one surface of a stretched nylon-66 film having a thickness of 12 $\mu$m was formed a silicon oxide layer (atomic ratio of silicon to oxygen=1:1.7) having a thickness of 50 nm by vacuum deposition method using a mixture of Si and $SiO_2$ as a vaporizing source. A heat sealable top coat having a thickness of 5 $\mu$m was formed on the deposition layer by applying a polyurethane adhesive solution comprising 30 parts by weight of a mixture of TAKELAC A-310 (solid content: 50% by weight, commercially available from Takeda Chemical Industries, Ltd.) and A-3 (solid content: 75% by weight, commercially available from Takeda Chemical Industries, Ltd.) in a mixing ratio of 12:1 by weight and 70 parts by weight of a mixed solvent of methyl ethyl ketone and ethyl acetate in a mixing ratio of 1:1 by weight onto the deposition layer and drying, thereby yielding a composite material.

EXAMPLE 5

On a stretched EVOH film having a thickness of 15 $\mu$m was formed an undercoat having a thickness of 0.1 $\mu$m by applying two component polyester anchor coating agent (AD 503 and CAT 10, available from TOYO MORTON, LTD.) by means of gravure coating and drying. On the undercoat were formed a silicon oxide layer having a thickness of 40 nm in the same manner as in Example 1 and further the polyethylene film layer in the same manner as in Example 1, thereby yielding a composite material.

COMPARATIVE EXAMPLE 1

An aluminum deposition layer having a thickness of 50 nm was formed on a stretched polyethylene film having a thickness of 30 $\mu$m, and a nonstretched polyethylene film having a thickness of 30 $\mu$m was dry-laminated onto the deposition layer in the same manner as in Example 1 to give a composite material.

COMPARATIVE EXAMPLE 2

An aluminum deposition layer having a thickness of 50 nm was formed on a stretched nylon-6 film having a thickness of 15 $\mu$m, and a nonstretched polyethylene film having a thickness of 30 $\mu$m was dry-laminated onto the deposition layer in the same manner as in Example 1 to give a composite material.

COMPARATIVE EXAMPLE 3

A nonstretched polyethylene film having a thickness of 30 $\mu$m was dry-laminated onto a stretched EVOH film having a thickness of 15 $\mu$m in the same manner as in Example 1 to give a composite material.

The constructions of the obtained composite materials are summarized in Table 1. The composite materials obtained in Examples 1 to 5 and Comparative Example 3 were transparent and the composite materials obtained in Comparative Examples 1 and 2 were opaque.

The helium gas barrier and the hydrogen gas barrier were determined with respect to each of the obtained composite materials. The results are shown in Table 2.

The gas barrier was evaluated by measuring the transmission rate of each gas through the composite material according to JIS K 7126 (Testing Method for Gas Transmission Rate through Plastic Film and Sheeting). (experiment conditions: 20° C., 60% RH).

A spherical balloon having a diameter of 50 cm was produced from each of the composite materials obtained in Examples 1 to 5 and Comparative Examples 1 to 3. The balloon was filled with helium gas to endow it with buoyancy. The balloon was allowed to stand in a room and the period of time till its balloon lost the buoyancy was determined. The results are also shown in Table 2.

TABLE 1

| | Base layer | | Undercoat, | Silicon oxide layer | | Polymer film layer | | Top coat | |
|---|---|---|---|---|---|---|---|---|---|
| | Material | Thickness ($\mu$m) | Thickness ($\mu$m) | Composition | Thickness (nm) | Material | Thickness ($\mu$m) | Material | Thickness ($\mu$m) |
| Ex. 1 | Stretched | 12 | — | Si $\times$ Oy | 70 | Nonstretched | 30 | — | — |

TABLE 1-continued

| | Base layer | | Undercoat, | Silicon oxide layer | | Polymer film layer | | Top coat | |
|---|---|---|---|---|---|---|---|---|---|
| | Material | Thickness (μm) | Thickness (μm) | Composition | Thickness (nm) | Material | Thickness (μm) | Material | Thickness (μm) |
| Ex. 2 | PET Stretched nylon-6 | 15 | — | Si × Oy x/y = 1/1.7 | 70 | Nonstretched polyethylene | 30 | — | — |
| Ex. 3 | Stretched EVOH | 15 | — | Si × Oy x/y = 1/1.7 | 70 | Nonstretched polyethylene | 30 | — | — |
| Ex. 4 | Stretched nylon-66 | 12 | — | Si × Oy x/y = 1/1.7 | 50 | Nonstretched polyethylene | | Polyurethane | 5 |
| Ex. 5 | Stretched EVOH | 15 | 0.1 | Si × Oy x/y = 1/1.7 | 40 | Nonstretched polyethylene | 30 | — | — |
| Com. Ex. 1 | Stretched polyethylene | 30 | — | Al deposition layer | 50 | Nonstretched polyethylene | 30 | — | — |
| Com. Ex. 2 | Stretched nylon-6 | 15 | — | Al deposition layer | 50 | Nonstretched polyethylene | 30 | — | — |
| Com. Ex. 3 | Stretched EVOH | 15 | — | — | — | Nonstretched polyethylene | 30 | — | — |

TABLE 2

| | Gas transmission rate ($ml/m^2 \cdot 24$ hrs · atm) | | Period till the helium-filled balloon loses buoyancy (days) |
|---|---|---|---|
| | helium | hydrogen | |
| Ex. 1 | 5 | 7 | 18 |
| Ex. 2 | 3 | 5 | 25 |
| Ex. 3 | 2 | 3 | 31 |
| Ex. 4 | 4 | 6 | 21 |
| Ex. 5 | 5 | 7 | 17 |
| Com. Ex. 1 | 32 | 50 | 5 |
| Com. Ex. 2 | 20 | 32 | 14 |
| Com. Ex. 3 | 52 | 95 | 4 |

The results of Table 2 show that the composite material of the present invention has an excellent gas barrier.

In addition to the materials or elements used in the Examples, other materials or elements can be used in the Examples as set forth in the specification to obtain substantially the same results.

As described above, since the composite material of the present invention has a high degree of barrier to helium gas or hydrogen gas, the balloon produced from the composite material can retain its buoyancy for a long period of time after it is filled with helium gas or hydrogen gas. Further, since it is unnecessary to use a thicker film or to laminate many films in order to improve gas barrier, the composite material can be made thinner, thereby endowing a balloon produced therefrom with a greater buoyancy. Moreover, since the balloon of the present invention is transparent, an article which is placed within the balloon is visible from the outside thereof.

What is claim is:

1. A buoyant balloon comprising a composite material which is transparent and which has a maximum helium gas transmission rate of 5 $ml/m^2 \cdot 24$ hrs·atm, said composite material comprising a plastic base layer comprising at least one member selected from the group consisting of nylon film, nylon film coated with a vinylidene chloride resin, polyester film, polyethylene terephthalate film coated with a vinylidene chloride resin, polypropylene film, ethylene-vinyl alcohol copolymer film, polyethylene film, polyvinyl alcohol film, and polyvinylidene chloride film and a transparent thin layer of silicon oxide provided on one surface of the plastic base layer, said silicon oxide layer having an atomic ratio of silicon to oxygen of 1:0.3 to 2.

2. The balloon of claim 1, wherein said plastic base layer comprises an ethylene-vinyl alcohol copolymer film.

3. The balloon of claim 1, wherein a second polymer layer is further provided on said silicon oxide layer.

4. The balloon of claim 3, wherein said second polymer layer is heat sealable.

5. The balloon of claim 4, wherein a top coat is further provided on said second polymer layer.

6. The balloon of claim 5, wherein said top coat is heat sealable.

7. The balloon of claim 1, wherein an undercoat is provided between said plastic base layer and said silicon oxide layer.

8. The balloon of claim 1, wherein the composite material is provided with a desired pattern on at least one of the outer surface and the inner surface thereof, and a lighting device is disposed within the balloon, thereby enabling illumination of the balloon from the inside thereof.

* * * * *